E. J. HERCHERT.
TIRE COVER.
APPLICATION FILED AUG. 30, 1919.
1,342,169.
Patented June 1, 1920.
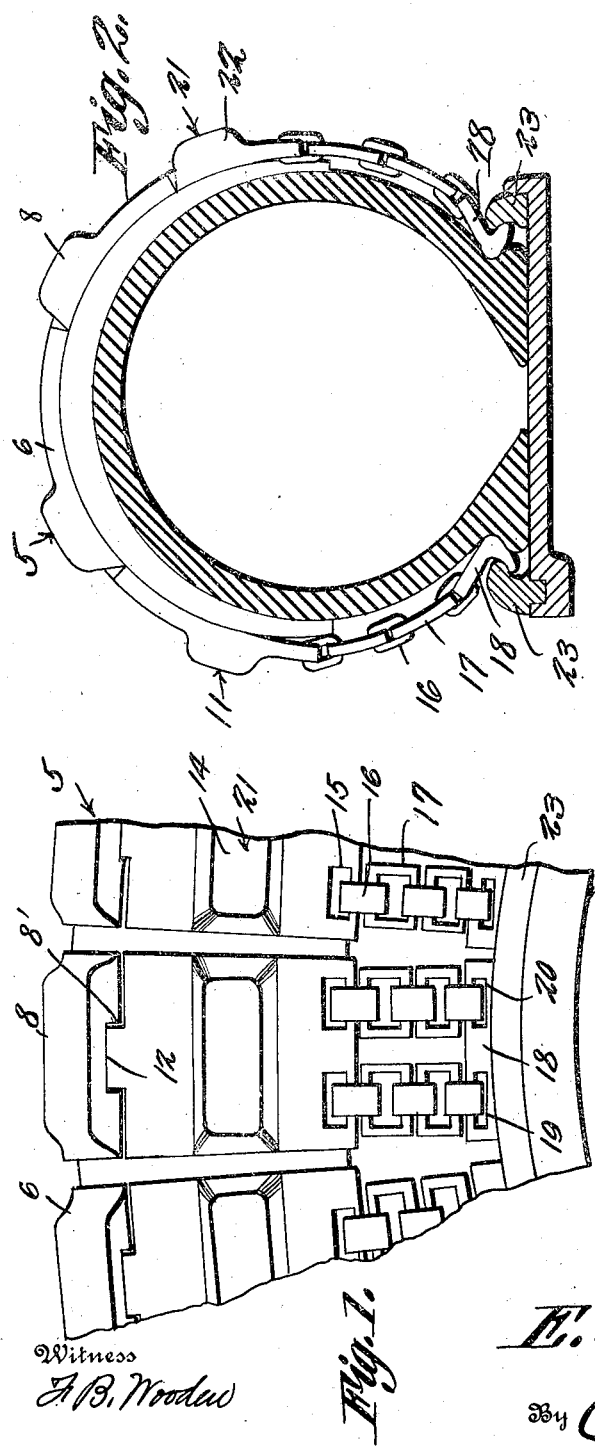
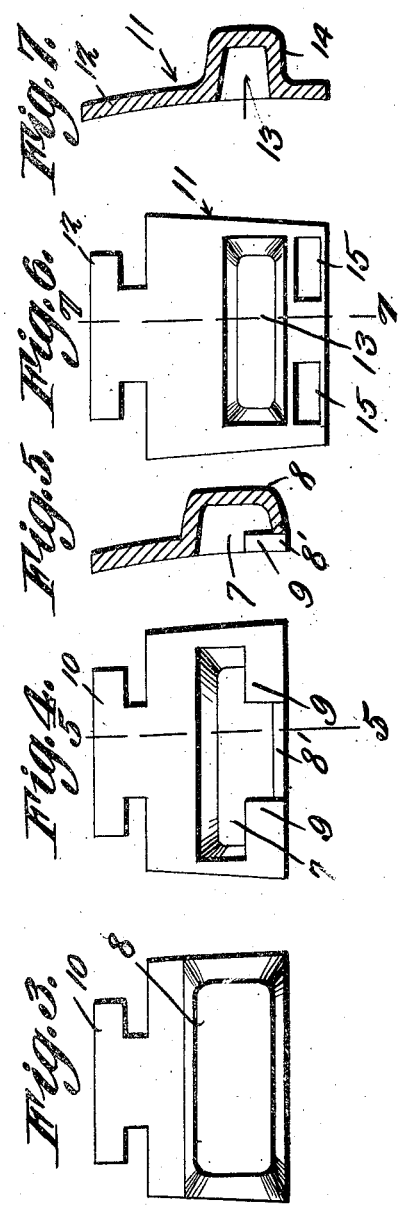
Witness
F. B. Wooden
Inventor,
E. J. Herchert
By C. A. Snow & Co.
Attorneys.

UNITED STATES PATENT OFFICE.

EDWIN J. HERCHERT, OF POSTVILLE, IOWA.

TIRE-COVER.

1,342,169.  Specification of Letters Patent.  Patented June 1, 1920.

Application filed August 30, 1919. Serial No. 320,842.

*To all whom it may concern:*

Be it known that I, EDWIN J. HERCHERT, a citizen of the United States, residing at Postville, in the county of Allamakee and State of Iowa, have invented a new and useful Tire-Cover, of which the following is a specification.

This invention relates to tire armors, and more particularly to an armor made up of a plurality of removable steel tread sections, supported directly on a tire, to relieve the tire associated therewith, of undue wear, thereby prolonging the life of the same.

A further object of the invention is to provide a device of this character having anti-skid qualities for preventing lateral skidding of a car, equipped with a tread as embodied in the present invention.

A further object of the invention is to construct the tread of a plurality of connected elements, capable of being readily and easily removed and replaced, in the event that one of the elements becomes worn out or otherwise rendered inoperative.

A still further object of the invention is to provide means for securing and mounting the tread on a tire, to prevent movement of the tread with relation to the tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a fragmentary view of a tire, and armor constructed in accordance with the present invention applied thereto.

Fig. 2 is a transverse sectional view through a tire and armor, the armor being constructed in accordance with the present invention.

Fig. 3 is a top plan view of one of the elements forming the tread of the tire cover.

Fig. 4 is a bottom plan view of the same.

Fig. 5 is a transverse sectional view taken on line 5—5 of Fig. 4.

Fig. 6 is a bottom plan view of one of the end sections of the tire cover.

Fig. 7 is a transverse sectional view taken on line 7—7 of Fig. 6.

Referring to the drawing in detail, the reference character 5 indicates a section of a tire armor constructed in accordance with the present invention, and includes the tread members 6, each of which is provided with a depression 7, forming the boss 8 on the outer surface thereof, the depression 7, which is formed in the under surface thereof, is provided with a cut-out portion 8', and inwardly extending flanges 9, which flanges together with the depression 7, provide a pocket to receive a T-shaped tongue 10, formed on the adjacent section.

The outer member 11 of the tire armor is provided with the T-shaped tongue 12, and a depressed portion 13, formed in the under surface thereof, and providing the boss 14 extending substantially the entire width of the member on the outer surface thereof. This member 11 is slightly curved to conform to the contour of the side edges of the tire to which the same is applied, one edge thereof being provided with spaced openings 15, which openings receive one end of the respective chain members 16, which include the substantially square links 17.

The lower ends of the chain member 16, have connection with a securing member 18, through the medium of the openings 19 and 20, formed therein, the lower edge of said securing member 18 extending outwardly and upwardly to provide a flange to be engaged by a securing member, to be hereinafter more fully described.

The end section 21 of the tire armor, is slightly different in construction, than the end section 11, in that the same in place of the T-shaped head, is provided with a depressed portion, in its under surface, forming the boss 22 in the outer surface, the walls adjacent the depression being inturned to provide a housing for the T-shaped tongue of the adjacent member of the armor.

The remaining portion of the end section 21, being the same as the end section 11, described above, it is believed to be unnecessary to describe in detail this construction.

As shown, the armor includes a plurality of sections spaced over the surface of a tire, the lower or securing members thereof, lying within the notched portions adjacent the bead of the tire, and coöperate with the fastening member 23. This fastening member, includes the well known type of clencher rim, now in use.

Having thus described my invention, what I claim as new is:—

In combination with an automobile tire and the clencher rim thereof, a tire armor including a plurality of spaced independent metallic sections each of the sections including a plurality of coöperating tread members and side members, each of the members having an enlargement formed on one of the surfaces thereof, said enlargements forming recesses on the under sides of the members, a shaped tongue formed in each member, flanges formed adjacent the respective recesses, said recesses adapted to accommodate the T-shaped tongues for securing the members together, said enlargements forming anti-skid means and a relatively long securing member engaging under the clencher rim, and a plurality of chain sections securing the side members to the securing member.

In testimony that I claim the foregoing as my own, I have hereto affixed my signature in the presence of two witnesses.

EDWIN J. HERCHERT.

Witnesses:
WM. J. KLINGBEIL,
BERT E. NETTLE.